United States Patent [19]
Lundbeck

[11] Patent Number: 4,978,210
[45] Date of Patent: Dec. 18, 1990

[54] RETAINER FOR EYEWEAR

[76] Inventor: Michael W. Lundbeck, 440 Quail Run Rd., Aptos, Calif. 95003

[21] Appl. No.: 381,521

[22] Filed: Jul. 18, 1989

[51] Int. Cl.⁵ .............................................. G02C 3/00
[52] U.S. Cl. .................................... 351/157; 351/156
[58] Field of Search ................ 351/43, 123, 130, 142, 351/155, 156, 157; 2/452; 24/3 C; D16/123, 129; 248/902

[56] References Cited

U.S. PATENT DOCUMENTS 4,515,449  5/1985  Davidson ............................ 351/156
4,768,231  9/1988  Schrack ..................................... 2/13

Primary Examiner—Rodney B. Bovernick
Attorney, Agent, or Firm—Jeffrey A. Hall

[57] ABSTRACT

An eyewear retainer of elastic-type material comprised of a first elongated strap that fits around the head of a person and containing closed loops at each end for engaging the bows of a eyewear; a second elongated strap that fits around the neck of a person and connecting to a third connecting strap which engages the midsection of the first and second straps. Mating pieces of hook and loop fasteners are provided at the ends of said third connecting strap for engagement with said first and said second straps, and on the ends of said first strap for engagement with the eyewear.

3 Claims, 1 Drawing Sheet

RETAINER FOR EYEWEAR

BACKGROUND OF THE INVENTION

1. Field of the Invention

The present invention relates to devices for holding eyeglasses and the like securely in place on a user's head, specifically to such devices for holding sunglasses in place during athletic endeavors such as surfing, skiing, kayaking, and other activities.

2. Description of Prior Art

There are a number of devices that have been used in the past to hold eyewear in place more securely than the bows of such eyewear. There are a number of headband-type devices disclosed in the prior art for holding faceshields on the head of the wearer. For example, U.S. Pat. Nos. 2,588,553 (McWethy); 3,214,767 (Weber); and 3,214,768 (Bohner). The above devices are cumbersome, quite complex, and designed as protective gear such as welder's eyeshields rather than for eyeglasses or sunglasses.

Other known devices in the art used for holding eyeglasses in place include a rigid helmet apparatus disclosed in U.S. Pat. No. 1,370,806 (Garner), an adjustable, semi-helmet apparatus disclosed in U.S. Pat. No. 2,504,524 (Hayward), and an array of holding apparatuses using adjustable straps to be used with eyeglass frames. For example U.S. Pat. No. 3,502,396 (Greenburg), and U.S. Pat. No. 2,541,493 (Baroso). The usefulness of these strap apparatuses are quite limited in demanding applications such as surfing, windsurfing, skiing, kayaking, and other sports where tearing forces from wind and water rip and remove eyewear from the user's head notwithstanding these apparatuses.

Another type of eyewear retaining apparatus in the prior art is U.S. Pat. No. 4,479,703 (Enghofer) which discloses eyeglass frames with elastic cords which may be extended from the rearmost ends of the bows. The elastic cords include devices for connecting their exposed ends together. This apparatus, however, is not readily adaptable to existing eyeglass frames, nor does it address the problem of securing eyewear during athletic endeavors.

A still different approach taught in the prior art is disclosed in U.S. Pat. NO. 4,133,604 (Fuller) where an eyeglass retainer comprising an elastic strap having tubular end portions formed by sewing together opposite edges of the terminal portions of the strap. The tubular portions are slipped over the end of the bows and placed on the horizontal temples of a pair of glasses. This device is bulky, unattractive, and had limited usefulness in athletic endeavors where the eyeglasses are subject to sudden tearing and jarring forces. A variation on this device is seen in U.S. Pat. No. 4,657,364 (Murrell) where an elastic material is secured over the downwardly curved bows of glasses with an extending strap with mating pieces of hook and loop fastening material to secure the device behind the user's head. This device did not address the problem of securing eyewear to a user's head when subject to tearing, jarring, and upward forces against the eyewear. Therefore, it has limited usefulness in, for example, athletic activities such as surfing, windsurfing, skiing, kayaking and the like.

What is desired, therefore, is an improved device for retaining eyewear that is simple to use, inexpensive, secure, comfortable, and which can secure the eyewear to the head even when subject to sudden forces such as waves, winds and other impacts. The device also should hold the eyewear in place under various conditions and be resistant to becoming loose or dislodged accidently. Finally, the device should be useful with conventional eyeglasses, sunglasses, and the like, and be easily convertable to a form appropriate for less vigorous activities.

OBJECTS OF THE INVENTION

The principal object of the present invention is to provide a retainer for eyeglasses, and in particular sunglasses.

It is another object of the invention to provide an inexpensive, reliable, and comfortable means for holding eyewear on the head under various and extreme conditions of use.

It is yet a further object of the invention to provide a retainer that provides both vertical and horizontal support for the eyewear.

A still further object of the present invention is to provide a means for holding and retaining eyewear which is adapted for use with all types of eyewear, and is readily convertable to a form appropriate for less vigorous activities if desired.

SUMMARY OF THE INVENTION

The present invention provides a snug and comfortable eyewear retainer which overcomes the aforementioned shortcomings and disadvantages of previously known devices for retaining eyewear on a wearer's head. The principal features of the invention include an eyewear retainer having respective elastic straps, with one of the straps being connected from the back ends of the bows of the eyewear around the back of the head of the user, and another strap circles the neck of the user. A connecting or stabilizing strap is connected between the straps which go around the head and the neck of the user. The strap that is connected to the bows is secured by means of circles of hook and loop fastening material that clasp the eyewear frame securely. The connecting strap is secured to the midsection of the head and neck strap by mating pieces of hook and loop fastening material. The straps are made of an elastic material that firmly secures the eyewear to the head of the wearer but are also comfortable.

Other objects and features of the invention will become apparent from a consideration of the ensuing drawing and detailed description.

DETAILED DESCRIPTION OF THE INVENTION

Figure 1:
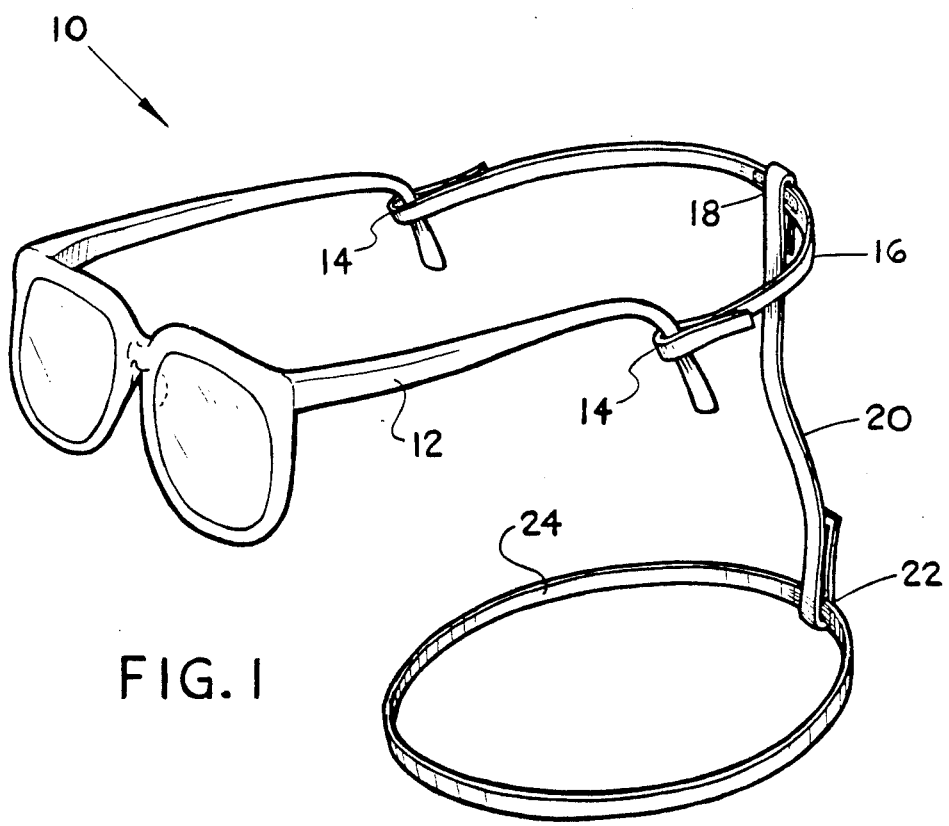
FIG. 1 is a view of a pair of glasses with an eyewear retainer attached thereto according to the invention.

Referring now to the drawing an eyewear retainer 10 according to the preferred embodiment is shown in FIG. 1 attached to a pair of eyeglasses 12. The eyewear retainer 10 comprises three separate parts, including a first head strap member 16, a second strap member 24 and a third connecting strap member 20. The head strap member 16 is attached to the downwardly curving rear end or bow of the eyewear by circular pieces of hook and loop fasteners 14. In another embodiment said hook and loop fasteners 14 made by looping a narrow and substantially straight pieces of hook and loop fastening material together as shown in FIG. 1 may be replaced by metal or plastic snap fasteners. The connecting strap member 20 is attached at one end to head strap member 16 at a midsection connecting point by mating pieces of hook and loop fasteners 18 and at the other end at a midsection connecting point by hook and loop fasteners 22 on neck strap member 24. In the preferred embodiment the straps 16, 20, and 24 are made of an elastic material sized to fit the head of a prospective user. The entire retainer 10 can be made in different sizes, for example adult sizes, children's sizes, and so forth. The tension of elastic strap retainer 10 allows for a secure fit yet one that is comfortable.

In operation eyewear retainer 10 provides a very secure and comfortable means of holding eyewear in place during, for example, athletic activities such as surfing, skiing, kayaking and the like. The wearer simply places neck strap 24 around his neck with head strap 16 around the back of the head. Connecting strap member 16 serves to connect and stabilize head strap 16 and neck strap 24.

If the wearer desires to remove connecting strap 20 and neck strap 24 he simply detaches the straps at 18 and 22 by separating the hook and loop fasteners. This may be desirable when, for example, the wearer gets out of the surf and engages in less vigorous activities on the beach.

Although the description above contains many specificities, these should not be construed as limiting the scope of the invention but as merely providing illustration of a preferred embodiment thereof. For example, the straps may be made of alternative materials, such as plastic or urethane; the connecting means between straps can be, for example, metal snaps, hook and loop fasteners, or conventional hook fasteners of plastic or metal; the head strap member may be secured to various positions on the temples of the eyewear piece rather than at the bow as illustrated in the preferred embodiment.

Therefore it is understood that the scope of the invention should be determined by the appended claims and their legal equivalents, rather than by the examples given.

I claim:

1. A retainer for holding eyewear securely in place on a person's head, comprising:

a first elongated strap in a preadjusted length position for engagement around the head of a person, said elongated strap containing means for engaging the bows of eyewear;

a second elongated strap in a preadjusted length position for engagement around the neck of a person containing means for engaging said first elongated strap; and a third elongated strap member connecting the midsections of said first and said second elongated straps.

2. The retainer for holding eyewear of claim 1 wherein said means for engaging said first elongated strap to the bows of eyewear comprises narrow and substantially straight mating pieces of hook and loop fastening material.

3. The retainer for holding eyewear of claim 2 wherein said means for engaging said first elongated strap to said second elongated strap comprises narrow and substantially straight pieces of hook and loop fastening material on the midsection of said first and second elongated straps and the ends of said third elongated strap.

* * * * *